No. 685,055. Patented Oct. 22, 1901.
F. D. T. LEHMANN.
CONTINUOUS KILN.
(Application filed Feb. 13, 1899.)
(No Model.) 10 Sheets—Sheet 1.

Witnesses
W. C. Colves
Wm. Geiger

Inventor
Friedrich D. T. Lehmann
By Rudolph ... Atty

No. 685,055.  
F. D. T. LEHMANN.  
CONTINUOUS KILN.  
(Application filed Feb. 13, 1899.)  
Patented Oct. 22, 1901.

(No Model.)  
10 Sheets—Sheet 2.

Witnesses  
W. E. Coates  
Wm. Geiger

Inventor  
Friedrich D. T. Lehmann  
By Rudolph Wm. Lotz  
Attorney.

THE NORRIS PETERS CO., PHOTO-LITHO., WASHINGTON, D. C.

No. 685,055. Patented Oct. 22, 1901.
F. D. T. LEHMANN.
CONTINUOUS KILN.
(Application filed Feb. 13, 1899.)

(No Model.) 10 Sheets—Sheet 3.

No. 685,055. Patented Oct. 22, 1901.
F. D. T. LEHMANN.
CONTINUOUS KILN.
(Application filed Feb. 13, 1899.)

(No Model.) 10 Sheets—Sheet 4.

No. 685,055. Patented Oct. 22, 1901.
F. D. T. LEHMANN.
CONTINUOUS KILN.
(Application filed Feb. 13, 1899.)
(No Model.) 10 Sheets—Sheet 7.

Fig. 8

Witnesses
W. C. Coolies
Wm. Geiger

Inventor
Friedrich D. T. Lehmann
By Rudolph Wm. Lotz
Atty

No. 685,055.

F. D. T. LEHMANN.
CONTINUOUS KILN.
(Application filed Feb. 13, 1899.)

Patented Oct. 22, 1901.

(No Model.)

Witnesses
W. C. Coolies
Wm. Geiger

Inventor
Friedrich D. T. Lehmann
By Rudolph Wm. Lotz
Atty

THE NORRIS PETERS CO., PHOTO-LITHO., WASHINGTON, D. C.

No. 685,055. Patented Oct. 22, 1901.
F. D. T. LEHMANN.
CONTINUOUS KILN.
(Application filed Feb. 13, 1899.)
(No Model.) 10 Sheets—Sheet 9.

Witnesses
W. C. Cooley
Wm. Geiger

Inventor
Friedrich D. T. Lehmann
By Rudolph M. Hunter
Atty

UNITED STATES PATENT OFFICE.

FRIEDRICH D. T. LEHMANN, OF CHICAGO, ILLINOIS.

CONTINUOUS KILN.

SPECIFICATION forming part of Letters Patent No. 685,055, dated October 22, 1901.

Application filed February 13, 1899. Serial No. 705,438. (No model.)

*To all whom it may concern:*

Be it known that I, FRIEDRICH D. T. LEHMANN, a citizen of the United States, residing at Chicago, in the county of Cook and State of Illinois, have invented certain new and useful Improvements in Continuous Kilns; and I do hereby declare the following to be a full, clear, and exact description of the invention, such as will enable others skilled in the art to which it appertains to make and use the same.

My invention relates to a novel construction in a continuous kiln for water-smoking and burning brick, tile, and other earthenware, the object being to provide a device of this character which can be burned continuously in one direction and which can be readily loaded and unloaded at different places without interfering with the burning; and it consists in the features of construction and combinations of parts hereinafter fully described and claimed.

In the accompanying drawings, illustrating my invention.

My invention consists, chiefly, in providing two sets of flues for my kiln, one set, which I term "water-smoke flues," being used only to water-smoke the material in the kiln by subjecting it to a blast of hot air drawn from compartments in which finished product is cooling and remove from the unfinished ware that part of the moisture contained in it which will evaporate at a comparatively low temperature to gradually prepare such ware for the advancing heat and prevent its being injured thereby. The other set, which I term "draft-channels," are used to direct and control the draft. The entire construction is extremely simple.

My kiln consists, primarily, of two permanent elements—namely, a floor A, which in the instance illustrated is rectangular, and a wall B, which rises from the middle of the floor A and forms the inner wall of the kiln. The brick, tile, or other material to be burned is piled upon said floor A and the outer removable wall C is set up along the outer edge of said floor A to a height somewhat greater than said brick or tile and progressively with the latter. A removable covering D is then laid upon the material to be burned and extends between the middle wall B and said outer wall C. In this manner a kiln is formed which I divide into a plurality of compartments by mounting temporary paper partitions E at intervals, which extend from floor to covering and from the inner to the outer walls of said kiln and by means of which, in combination with the removable walls and covering, I form perfectly air-tight compartments.

It must be understood that all the compartments of my kiln are never set up at any one time, but that there are always several compartments of which the outer walls and covering are removed for purposes of loading and unloading, while the remaining complete compartments are undergoing the water-smoking, burning, and cooling processes.

In the instance illustrated I have provided a floor and middle wall to accommodate ten kiln-compartments, the number of same being determined by the number of sets of flues under the floor and likewise in said middle wall.

Each kiln-compartment has a draft-channel $a$ extending underneath the floor and outwardly from said middle wall, and likewise a water-smoke flue $b$ parallel with said draft-channel $a$, (except in the case of two corner-compartments,) but at the opposite end of the compartment, said flues communicating with said compartments through openings in said floor and establishing the draft connection between the lower part of the compartments and the main draft-channel and the main water-smoking channel, respectively. A vertical flue $c$ in said wall B connects said draft-channel $a$ with the main draft-channel F in the upper part of said middle wall B. A vertical flue $d$ connects the water-smoke flue $b$ with the main water-smoke flue G in the upper part of said wall B, which extends completely around said flue F and is, so to speak, "endless." All lateral draft and water-smoking flues form continuous draft-channels with the vertical flues and are connected in the masonry with each other and with the main draft-channel and the main water-smoking flue, respectively. Each of said vertical flues $c$ and $d$ is controlled by a damper $e$ and $f$, respectively. Said main draft-channel F is connected with the chimney H by means of the bridge-flue I, so that by raising any one of said dampers $e$ the draft can be directed from any desired compartment. The main water-smoke flue G is connected with said main draft-channel F by means of passages $g$, corresponding in number with the compartments of the kiln, and each of said passages is controlled by dampers $g'$. Thus by opening any one of said passages $g$ a draft will be produced in said water-smoke flue G, and thereby also in any desired one of the kiln-compartments, by opening one of the vertical flues $c$. Each kiln-compartment also communicates directly with said main water-smoke flue G through an opening $h$ in the side of said wall B, such opening being at the opposite end of the compartment from said flue $b$ and controlled by a damper $h'$ and establishes the draft connection between the upper part of each compartment and the main water-smoke flue G. Between each of said flues $d$ and openings $h$, communicating with the same kiln-compartment, said main water-smoke flue G is provided with a cross-damper $i$, which serves to interrupt the draft at any desired point and enable it to be led through any one of the kiln-compartments when desired.

As before stated, in the drawings I have illustrated a kiln of ten compartments. These I will refer to as 1, 2, 3, 4, 5, 6, 7, 8, 9, and 10, and in referring to the flues, dampers, &c., controlling different compartments I will term such flues and dampers $a^6$ $b^6$ $h^6$ $h'^6$, by which it will be understood that such flues and dampers are located either in the compartment 6 or in the wall B adjacent compartment 6.

The operation of the kiln is described in a general way as follows: My kiln is operated on the principle that a certain quantity of ware—as much, for instance, as will fill one or more compartments—is made, dried, set in the kiln, water-smoked, prepared for the fire, burned, and removed ready for shipment every day, thus systematizing the manufacture. On the first day, commencing at the starting-point, the walls of compartment No. 1 are set up simultaneously with the ware to be burned, the covering is put in place, and the paper partition is applied just behind the flue-openings leading to the lateral draft-channel $a$ in the floor and between the latter and the flue-openings leading to the lateral water-smoking channel $b$ in compartment No. 2. On the second day compartment No. 2 is set, covered, and partitioned in the same manner, and the draft is led through the flue $a^2$ by removing the paper and adjusting the papers to connect the last-named flue with the flue F and disconnect flue $a'$. In this manner one compartment is set and put into operation every day or other intervals. As soon as the first rows of goods in the first compartment are heated sufficiently to ignite the fuel the latter is introduced through fire-holes in the covering of the kiln, and the fire which had been temporarily built in a temporary furnace in front of said compartment No. 1 is extinguished and such temporary furnace removed. The heat is then advanced gradually by means of advancing the fires and by the aid of the dampers, as the circumstances demand. When such firing from the top has advanced through a number of compartments, the different compartments will be occupied practically as follows: Nos. 2 and 3 are cooling, Nos. 4 and 5 are in full fire, in Nos. 6 and 7 the fire is gradually advancing, No. 8 is being water-smoked, No. 9 is being set up, No. 10 is left empty, and No. 1 is being unloaded and the finished product therefrom shipped.

Described in detail, the above operation is as follows: After the temporary furnace and the first compartment have been set up, as above described, and the fire started in such temporary furnace the vertical flue $c'$ is opened by raising the damper $e'$, thereby connecting draft-channel $a'$ with the main draft-channel F and causing a draft toward said draft-channel $a'$. The material thus becomes gradually heated to a degree sufficient to ignite fuel introduced into said compartment 1, and when such temperature is reached fuel is introduced into said compartment through the openings in the covering which are arranged in lateral rows at frequent intervals. The material is so set up that each row of fire-holes is in vertical alinement with fire-shafts formed between lateral rows of material. The fuel is preferably crude oil introduced by steam-injectors, and each row of burners forms a wall of fire in such lateral fire-shafts. Any other fuel can of course be used. During the interval in which the material in chamber 1 is being heated chamber 2 is set up, and before the heat in chamber 1 has become intense the paper partition separating the two chambers is ripped and destroyed, so that the heat will enter chamber 2. To this end damper $e'$ is closed and damper $e^2$ is opened, thereby forcing the heated gases to traverse chamber 2 before passing into the draft-channel $a^2$, and thus to the chimney. In this manner the material in chambers 1 and 2, and subsequently chambers 3 and 4, is first water-smoked and subsequently by advancing the fire burned. After firing from top of kiln is commenced the heat is advanced gradually, as the circumstances demand, by progressively abandoning the finished rows of fire-holes and putting into operation new ones. The time required to burn various materials differs greatly, according to the nature of the raw material and the size and nature of the goods made therefrom. No definite length of time can be set for burning any material; but the operator must be able to judge when his product is finished and advance his fires accordingly. Thus if direct firing is going on in compartments 1 and 2 and compartments 3 and 4 are being gradually heated the operator must upon examination be able to determine when the first row in compartment 1 is finished, and also when the first row of compartment 3 is hot enough to admit of direct firing. As soon as said first row is finished firing in front of same is discontinued, and if the first row of chamber 3 is sufficiently heated to admit of direct firing in front of same the fire is advanced thereto. Likewise he must use his judgment regarding the destruction of paper partitions to advance the heat to new compartments, this being effected after water-smoking of the material in such new compartment has been finished, as hereinafter described. After firing has thus progressed in the kiln the advantage of the "continuous" operation really begins and the water-smoking flues are utilized. At this time compartment 1 has been burned, compartments 2, 3, and 4 are burning, compartments 5, 6, and 7 are warming, compartment 8 has been set up, compartment 9 is being set up, and compartment 10 is not set up. Obviously compartment 1 requires time to cool before it can be unloaded, and as it is very hot I utilize the heat therefrom to heat the air which must pass through it before it can enter the succeeding compartment and use it also for the purpose of water-smoking the material in compartment 8, which is still separated from the remaining compartments by the paper partition between it and compartment 7. To this end I open the damper $h'^1$, thus connecting compartment 1 with the main water-smoking flue G, and I also open the cross-dampers $i^2$, $i^3$, $i^4$, $i^5$, $i^6$, and $i^7$, thereby giving the hot air introduced through the opening $h'$ free passage. Cross-dampers $i'$ and $i^8$ remain closed for obvious reasons, the latter to prevent the hot air from by-passing compartment 8. The damper $f^8$ is opened, thus uncovering the vertical flue $d^8$. Damper $h'^8$ is opened, as is also the damper $g'^8$, thus connecting flue G with the compartment 8 and also with the main draft-channel F, thereby creating a suction in the section of said flue G between the cross-dampers $i^8$ and $i^9$ and also in the compartment 8. Such suction is communicated to the water-smoke channel $b^8$, the flue $d^8$, and thence to the compartment 1 through the flue G, thus drawing the hot air from the upper part of compartment 1 under the covering and causing it to enter compartment 8 to water-smoke the material therein. The firing from the top in compartment 2 is discontinued gradually and the fire advanced to compartment 5. The paper partition between compartments 7 and 8 is ripped. The compartment 9 will have been completed, and, the water-smoking operation advanced into same, compartment 10 will be loading and compartment 1 unloading. Thus at intervals the firing in one compartment is discontinued, the water-smoking in another is completed, the loading of a third is completed, the fourth is unloaded, while the fifth is cooling. Two compartments are firing and three are being prepared for the advancing heat. In order to so advance the firing and the operations, it is obviously necessary to operate the dampers to control the draft and lead it to wherever it is required by the circumstances.

During the water-smoking operation it is obvious that, by the natural tendency of the hot air to rise, that part of the material on or adjacent the floor, but not adjacent the flue $b$, will not be subjected to the action of such hot air to the same extent as the remaining material. By my construction I obtain the great advantage that the draft can readily be made to pass along the floor from the water-smoke flue $b$ to the draft-channel $a$ by closing damper $h'$ and opening damper $e$. While thus leading the draft along the floor it will be obvious that some of the hot air will rise, carrying the vapors with it, and such hot air and vapors are subsequently drawn off through the opening $h$ by opening damper $h'$ and closing damper $e$. Thus in chamber 8 the damper $h'^8$ would be closed for a time and damper $e^8$ opened, causing a draft from flue $b^8$ to draft-channel $a^8$ along the floor. It is, in fact, my practice to first cause the hot air to heat the lower strata until same are sufficiently warmed and dried to produce a uniform temperature throughout the whole compartment during the water-smoking operation. After the lower strata have been sufficiently heated, damper $e^8$ is closed and damper $h'^8$ opened, thereby creating a draft through the upper strata and heating the latter.

Figure 1:
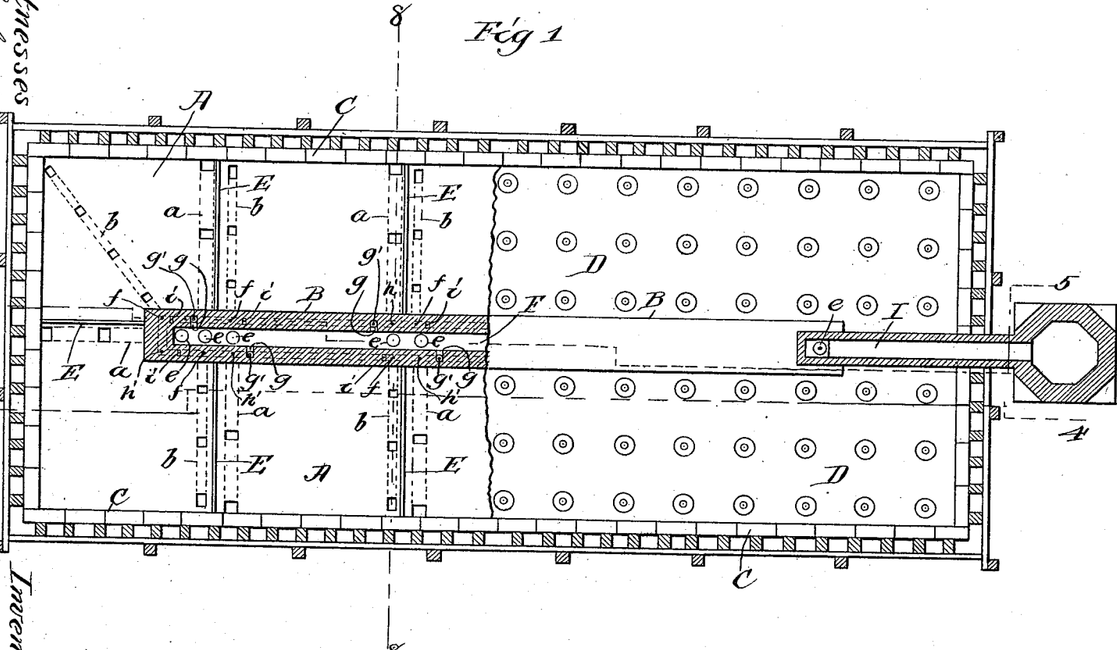
Figure 1 is a top plan view, partially in section, of a kiln constructed in accordance with my invention.
Figure 2:
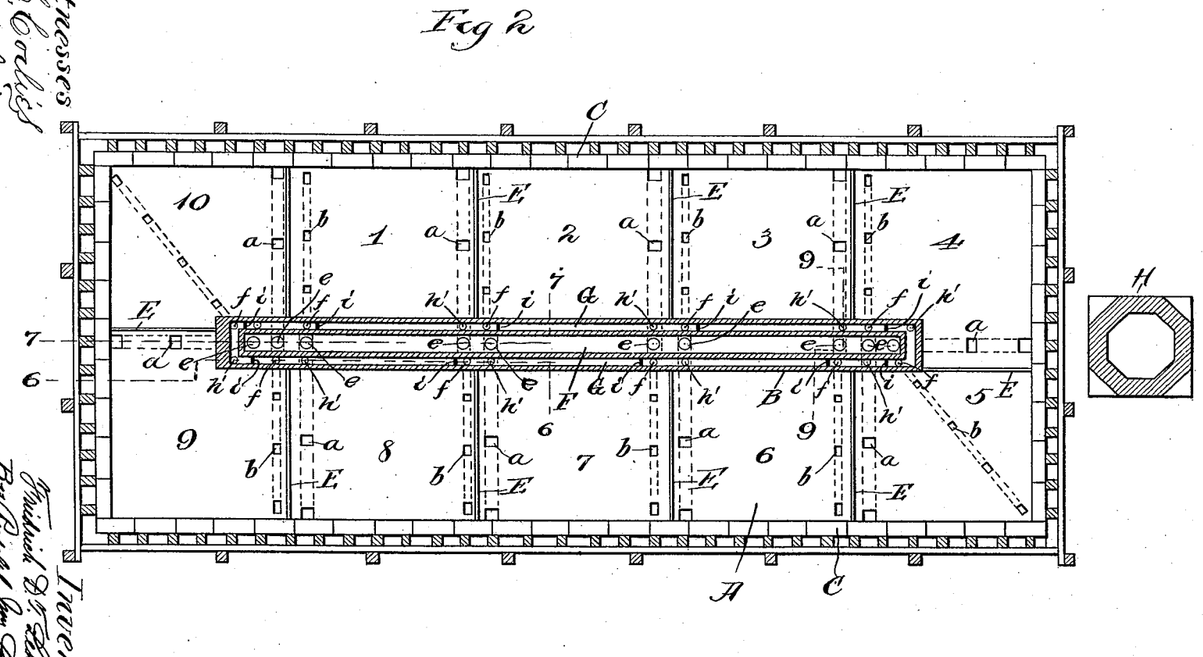
Fig. 2 is a horizontal section of same on the line 2 2 of Fig. 4.
Figure 3:
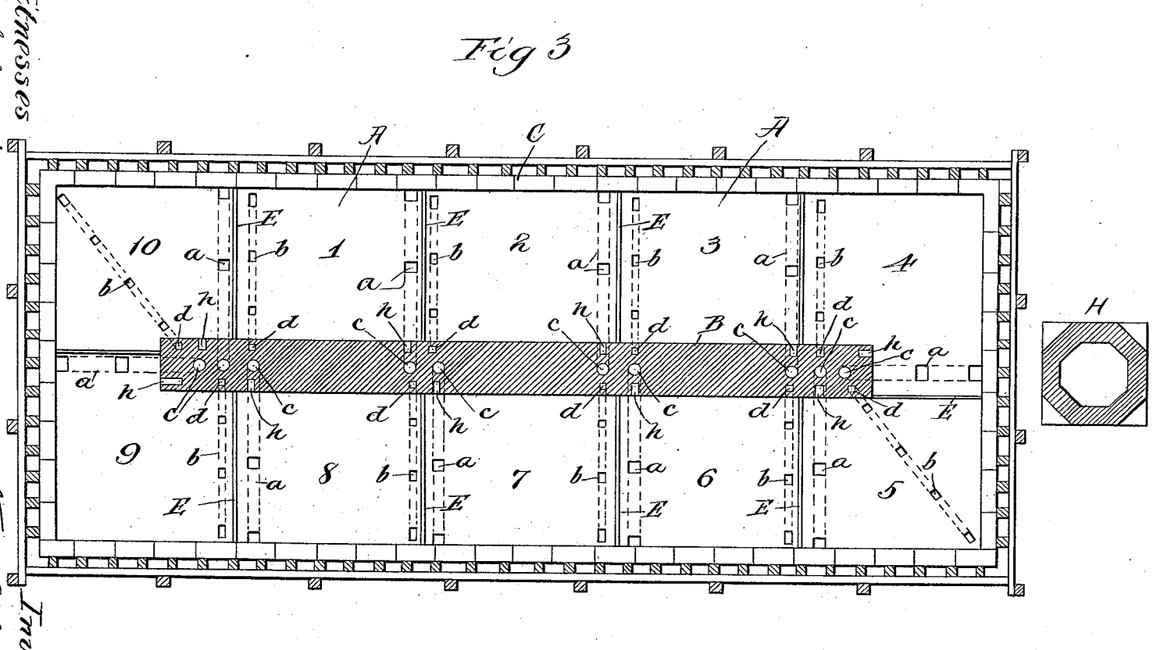
Fig. 3 is a horizontal section on the line 3 3 of Fig. 4.
Figure 4:
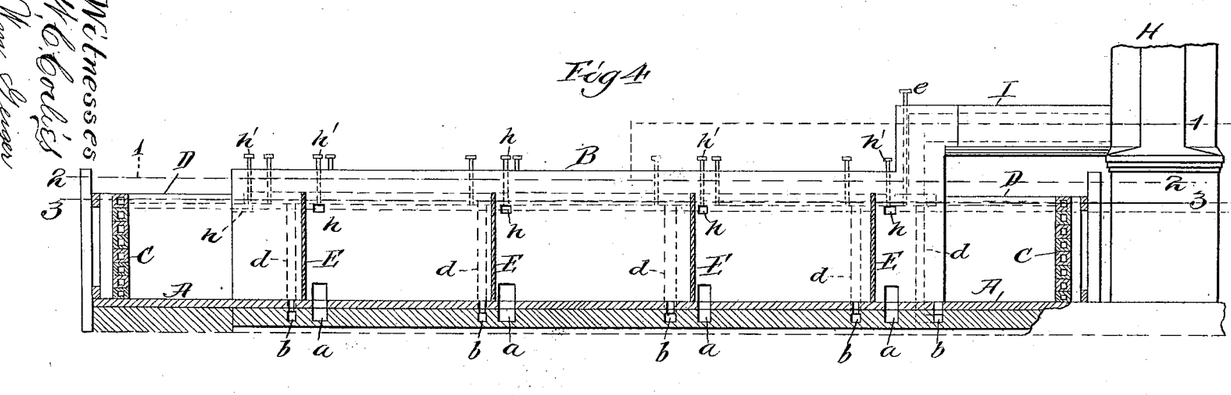
Fig. 4 is a sectional view on the line 4 4 of Fig. 1.
Figure 5:
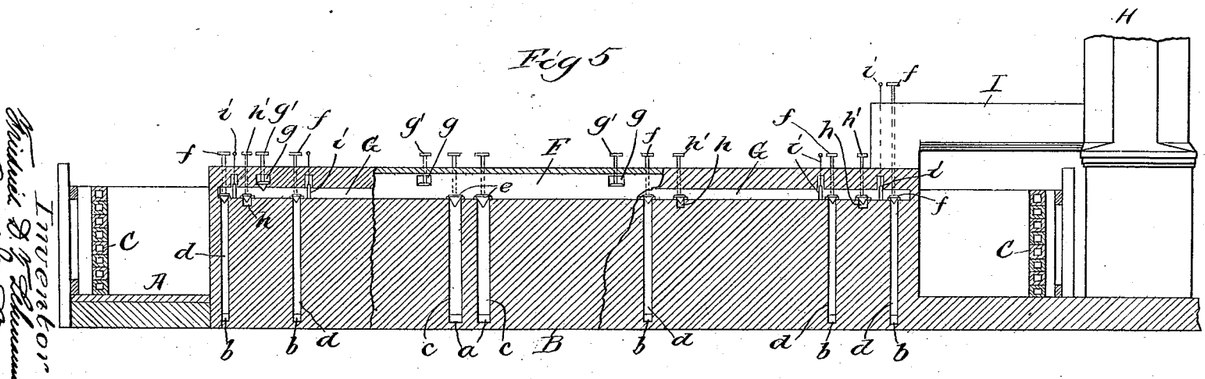
Fig. 5 is a sectional view on the line 5 5 of Fig. 1.
Figure 6:
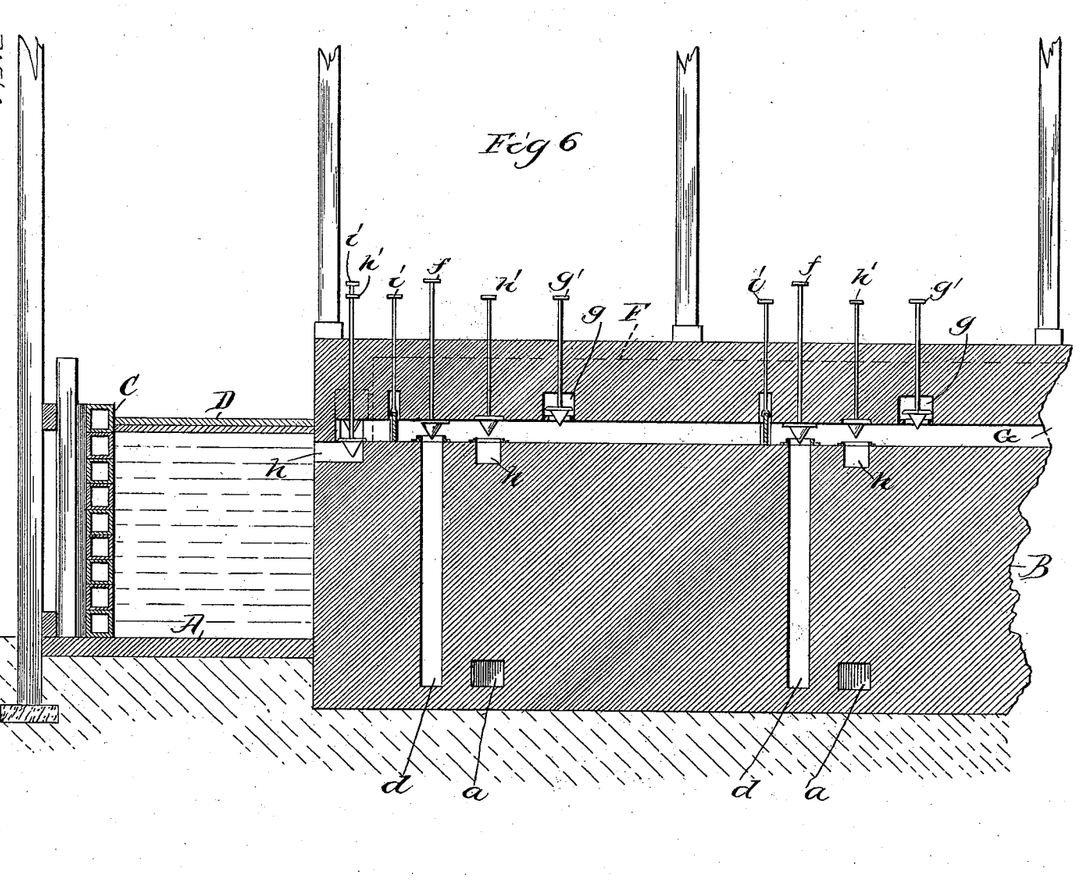
Fig. 6 is a sectional view on the line 6 6 of Fig. 2 on an enlarged scale.
Figure 7:
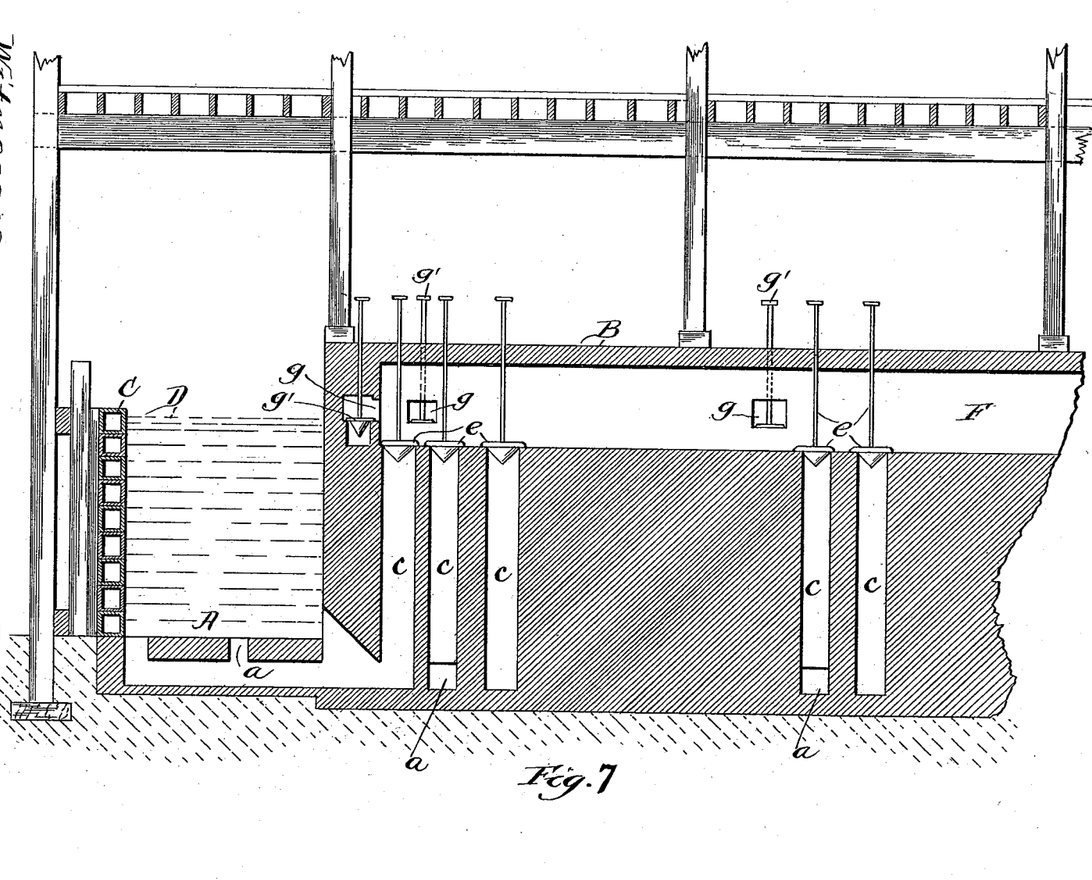
Fig. 7 is a sectional view on the line 7 7 of Fig. 2, also on an enlarged scale.
Figure 8:
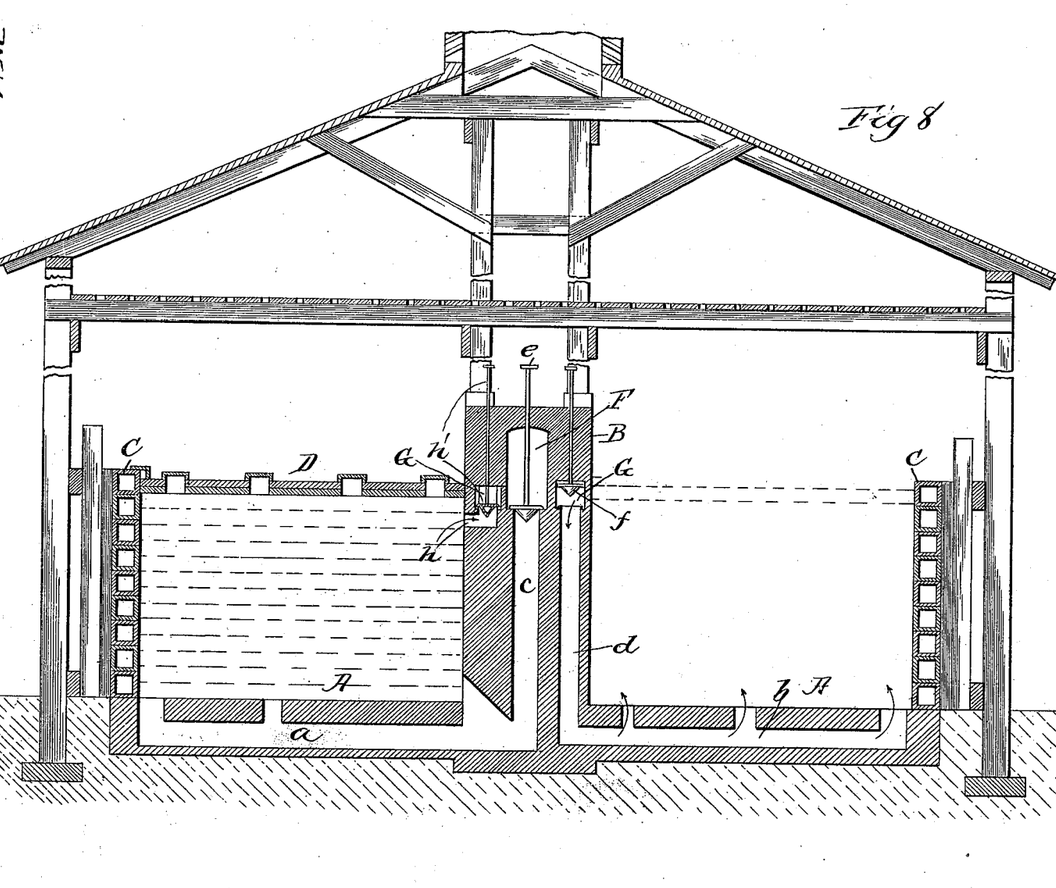
Fig. 8 is a transverse vertical section on the line 8 8 of Fig. 1.
Figures 9, 10, 11, 12:
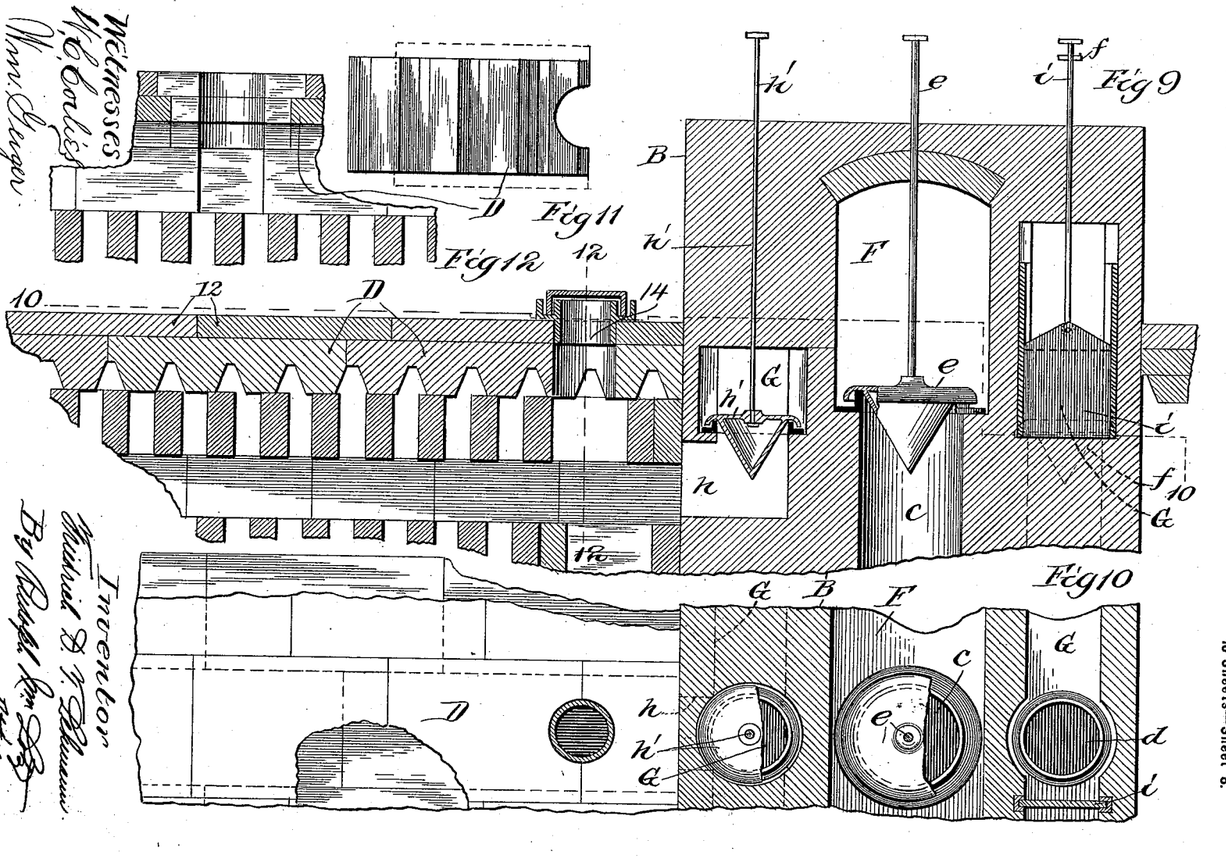
Fig. 9 is a detail sectional view, on an enlarged scale, on the line 9 9 of Fig. 2.
Fig. 10 is a sectional view on the line 10 10 of Fig. 9.
Fig. 11 is a detail bottom plan view of a covering-tile.
Fig. 12 is a detail sectional view on the line 12 12 of Fig. 9.
Figure 13:
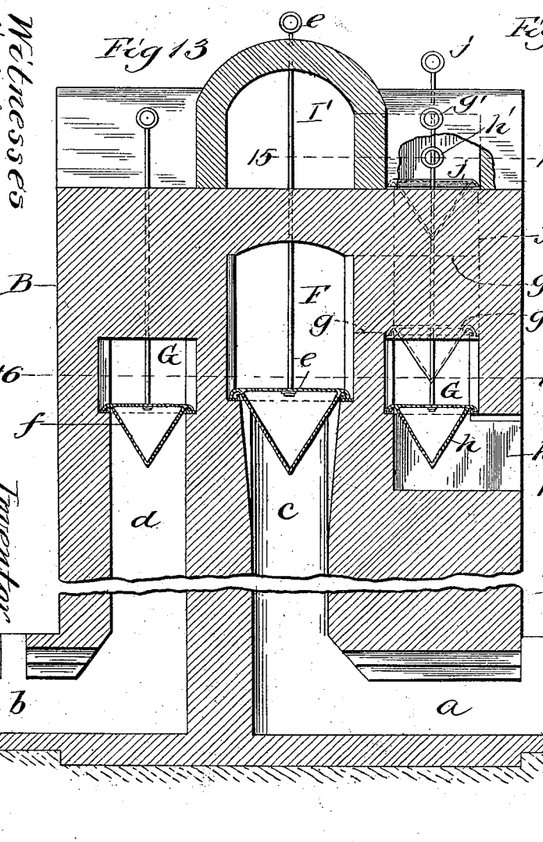
Fig. 13 is a transverse sectional view, showing a modified form of construction, taken on the line 13 13 of Fig. 14.
Figures 14, 15:
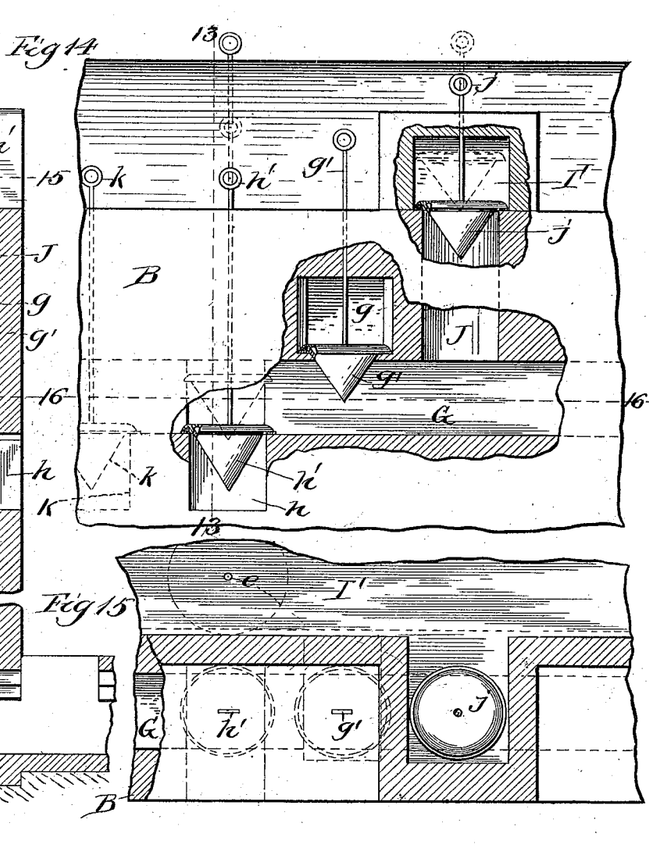
Fig. 14 is a fragmentary side elevation, partly in section, showing the modified form of construction.
Fig. 15 is a fragmentary sectional view on the line 15 15 of Fig. 13.
Figures 16, 17, 18:
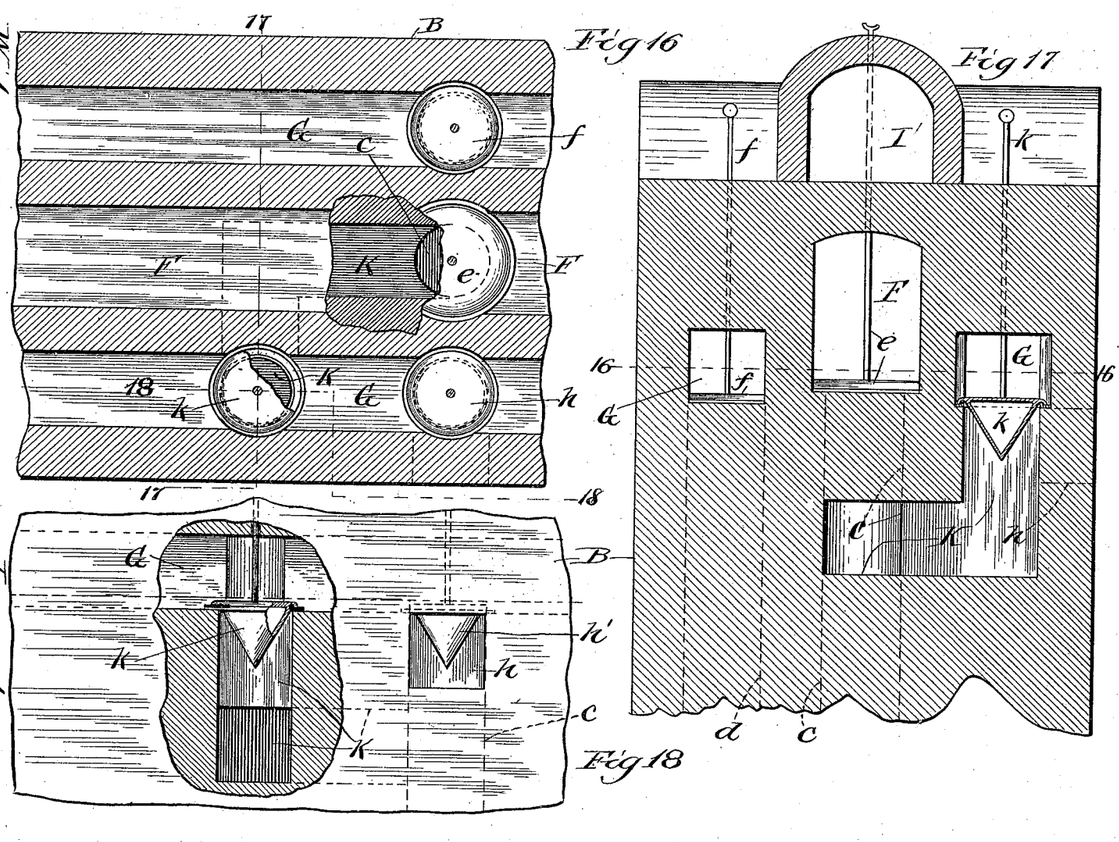
Fig. 16 is a sectional view on the line 16 16 of Figs. 13 and 14.
Fig. 17 is a sectional view on the line 17 17 of Fig. 16.
Fig. 18 is a sectional view on the line 18 18 of Fig. 16.

In case it is desired to utilize the heated air passing through the main draft-channel and which otherwise escapes through the chimney for the purpose of drying it is absolutely necessary that the same should be absolutely dry, and therefore should not be mixed with the moist air from a compartment undergoing the water-smoking process. To obviate this, a flue I may be provided above said flue F, which is connected with the flue G by means of passages J, in which dampers $j$ are interposed to control such connection, as shown in Figs. 13 to 18, inclusive. The construction shown in these figures also includes flues K, leading from each of the vertical draft channels or flues $c$ to the main water-smoke flue G, each of said flues K being controlled by a damper $k$. Thus when it is desired to water-smoke the lower stata of the material damper $k$ of the compartment undergoing the water-smoking operation is opened and damper $h'$ of same compartment closed, thus causing the draft from flue G to be communicated to draft-channel $a$. When said flue K is utilized, the damper $e$ will of course remain closed, thereby entirely avoiding admission of damp gases to the main draft-channel F when so desired.

The covering of the kiln consists of a layer of tiles D, which are provided with ribs on their lower faces resting directly upon the bricks or tiles to be burned in a manner to break the joints. Tiles 12 are laid over said tiles D, so as to cover the joints between the tiles D where the latter are in contact with each other. The interstices between the tiles 12 are either filled with sand or sealed with moist clay. At regular intervals in said covering I provide openings 14, which connect with fire-shafts formed by the setting of the ware, through which fuel is introduced.

I have not illustrated any means for introducing hydrocarbon fuel, as I do not wish to complicate this case; nor have I illustrated the manner in which a temporary wall and furnace is built before the first compartment when firing is commenced, for the reason that this will be readily understood by any person skilled in the art without illustration.

I claim as my invention—

1. A continuous kiln comprising a permanent floor, a permanent wall mounted upon the middle thereof, outer removable walls and a removable covering adapted to be set up upon said floor and adjacent said middle wall to form a complete kiln, combustible partitions dividing said kiln into a plurality of chambers, a horizontal fire-flue in said middle wall, a lateral draft-channel underneath said floor in each of said compartments, vertical flues connecting said lateral draft-channels with said fire-flue, a horizontal water-smoke flue in said middle wall surrounding said fire-flue, channels connecting said water-smoke flue with the upper portion of each kiln-compartment, a lateral water-smoke channel underneath said floor in each kiln-compartment, vertical flues connecting the latter with said first-named water-smoke flue, connection between said horizontal flues in said middle wall and devices for drawing off the gases therefrom, and dampers controlling all of said connections, substantially as described.

2. A continuous kiln comprising a permanent floor, a permanent wall mounted upon the middle thereof, outer removable walls and a removable covering adapted to be set up upon said floor and adjacent said middle wall to form a complete kiln, combustible partitions dividing said kiln into a plurality of chambers, a horizontal fire-flue in said middle wall, a lateral draft-channel underneath the floor in each of said compartments, vertical flues extending downwardly from said horizontal flue and connecting the latter with said lateral draft-channels, a horizontal water-smoke flue in said middle wall surrounding said fire-flue, channels connecting said water-smoke flue with the upper portion of each kiln-compartment, a lateral water-smoke channel underneath the floor in each of said compartments, vertical flues connecting said water-smoke flue with said lateral water-smoke channels, connection between said fire-flue and water-smoke flue in said middle wall, connection between said fire-flue and a chimney, and dampers controlling all of said connections, substantially as described.

3. A continuous kiln comprising two permanent members, namely a floor and a middle wall mounted thereon, and two removable members, namely, an outer wall and covering, combustible partitions dividing said kiln into compartments, flues in said floor and middle wall connected with each compartment and adapted to control the draft and flues parallel with said first-named flues and adapted to be connected therewith for producing an independent draft through one compartment for water-smoking the material therein previous to burning, and openings in said covering through which fuel is adapted to be fed to said kiln, substantially as described.

4. A continuous kiln comprising two permanent members, namely a floor and a middle wall mounted thereon, and two removable members, namely, an outer wall and covering, combustible partitions dividing said kiln into compartments, flues in said floor and middle wall connected with each compartment and adapted to control the draft, and flues parallel with said first-named flues and adapted to be connected therewith for the purpose of establishing an independent draft through one compartment for water-smoking the material therein previous to burning, and dampers controlling all of said flues, substantially as described.

5. In a continuous kiln, adapted to be divided into compartments and provided with fire-flues and water-smoke flues, connection between one end of each compartment and the fire-flue, connection between the upper portion of each compartment and the water-smoke flue, connection between the lower portion of each compartment at its other end and said water-smoke flue, and dampers controlling said connections, whereby a current of hot air can be passed through the lower portion of each compartment and through the upper portion thereof to uniformly water-smoke and heat the material therein, substantially as described.

In testimony whereof I affix my signature in presence of two witnesses.

FRIEDRICH D. T. LEHMANN.

Witnesses:
RUDOLPH WM. LOTZ,
WM. B. SNOWHOOK.